United States Patent [19]

Heavey et al.

[11] Patent Number: 4,956,597
[45] Date of Patent: Sep. 11, 1990

[54] METHOD AND APPARATUS FOR CHARGING BATTERIES

[75] Inventors: Frederick D. Heavey, St. Paul; Rudolph Engleman, Minneapolis, both of Minn.

[73] Assignee: American Monarch Corporation, Minneapolis, Minn.

[21] Appl. No.: 317,102

[22] Filed: Feb. 28, 1989
(Under 37 CFR 1.47)

Related U.S. Application Data

[63] Continuation of Ser. No. 10,828, Feb. 4, 1987, abandoned.

[51] Int. Cl.⁵ .................. H02J 7/00; H01M 10/44
[52] U.S. Cl. .................. 320/14; 320/21; 320/39
[58] Field of Search .................. 320/14, 21, 22, 39

[56] References Cited

U.S. PATENT DOCUMENTS

| | | | |
|---|---|---|---|
| 3,090,904 | 5/1963 | Jensen | 320/37 X |
| 3,857,087 | 12/1974 | Jones | 320/14 X |
| 3,886,428 | 5/1975 | Macharg | 320/21 X |
| 3,992,658 | 11/1976 | Bechtold et al. | 320/20 |
| 4,091,320 | 5/1978 | Foster | 320/40 |
| 4,213,081 | 7/1980 | Taylor | 320/40 |
| 4,354,148 | 10/1982 | Tada et al. | 320/20 |
| 4,387,332 | 6/1983 | Oyamada et al. | 320/15 |
| 4,418,310 | 11/1983 | Bollinger | 320/39 |
| 4,422,032 | 12/1983 | Kakumoto et al. | 320/39 |
| 4,499,415 | 2/1985 | Itoh | 320/14 X |

Primary Examiner—R. J. Hickey
Attorney, Agent, or Firm—Merchant, Gould, Smith, Edell, Welter & Schmidt

[57] ABSTRACT

A method and apparatus for charging batteries of the type characterized by entry into a gassing phase just prior to reaching full charge, are disclosed. Means are provided for periodically applying a load across the battery terminals during charging of the battery and for accurately measuring the battery discharge through the load. All signals other than those directly attributable to the battery energization of the load are removed from the measured signal. The isolated load response signal is compared to a predetermined threshold value established for the battery being charged to accurately determine when the battery enters into its gassing phase. Battery charging is maintained following entry of the battery into its gassing phase for a period of time known to return a predetermined overcharge of approximately 5 to 15% to the battery.

31 Claims, 5 Drawing Sheets

METHOD AND APPARATUS FOR CHARGING BATTERIES

This is a continuation of application Ser. No. 010,828, filed Feb. 4, 1987, now abandoned.

FIELD OF THE INVENTION

This invention relates generally to electrical charging of batteries, and more particularly to a battery charger control circuit for electrically charging lead-acid and similar types of rechargeable batteries.

DESCRIPTION OF THE ART

There are many practical applications for rechargeable batteries of the lead-acid and similar type. Besides their well known use in the automotive industry, they are commonly found in such diverse applications as powering golf carts and wheelchairs, and in numerous industrial, agricultural and recreational applications. The use requirements of such batteries typically demand a fairly deep discharge at a relatively high rate.

Providing a general purpose battery charger for optimizing the recharging of such batteries presents significant design problems. The batteries generally require a rapid recharge and a slight, but controlled, overcharge in order to maximize their service. Undercharging of the battery provides less than optimum output and service from the battery; whereas excessive overcharging of the battery can permanently damage the battery and even present safety hazards caused by, for example, boiling of the battery electrolyte. Accurate control of the charge cycle, and particularly the overcharge, of such batteries becomes particularly important in lowering time and cost in maintenance of the battery electrolyte, in maximizing performance of the battery, and in general, in extending battery life.

Accurate control of the battery charge cycle is difficult to implement in the field for a number of reasons, each of which can significantly affect the manner in which any given battery will respond during a charging cycle. For example, the state of charge or discharge (i.e. 50%, 75%, 90% etc.) of the battery to be charged is typically not known. The use, age and maintenance history of the battery to be charged is also generally not known. The actual internal battery temperature, as compared to the ambient temperature, is also typically an unknown factor. Further, where a plurality of batteries are connected together to form a battery pack, it is generally not known whether each of the batteries is in the same charged condition and/or state of repair as its neighbors, which can significantly affect the manner in which individual batteries will respond during the charging operation of the entire battery pack.

A practical battery charger control network should be relatively simple and inexpensive, and should be capable of rapidly bringing a battery or battery pack up to charge, without overcharging, while simultaneously accommodating and accounting for the above-listed battery variables and unknowns. An ideal battery charger should also have the capability of maintaining a battery charge during extended periods of nonuse, when, for example, the battery is connected to the charger for days or perhaps even weeks at a time.

Battery charging circuits of the prior art have been less than ideal in addressing or satisfying the above conditions. In order to simplify the charger control circuitry and therefore the cost of the battery charger, the most basic types of battery charging networks have simply used a manual On/Off charge control or have charged the battery for a predetermined time period as determined by a timer control circuit. Such trial-and-error charging systems obviously could not accurately account for the actual state of charge of the batteries and were highly susceptible to severe overcharging or undercharging of the batteries.

More sophisticated chargers have attempted to accurately control the charging operation by monitoring the actual charging voltage or rate of change of the charging voltage as a function of charging time. Referring to FIG. 1, an unscaled diagrammatic graph of a typical current and voltage relationship for the charging voltage and charging current of a battery charger are illustrated as they would typically appear during the charging cycle of a battery. In order to effectively charge a battery, the charging voltage must exceed the real time terminal battery voltage at any given instant of time during the charging cycle. Further, in order to provide the desired amount of overcharge to a battery, the actual battery charging voltage $V_{chg}$ must exceed the specified nominal voltage ($V_B$) for the battery as illustrated in FIG. 1. It will be noted from FIG. 1, that the rate of change of the charging voltage $V_{chg}$ decreases as the battery charge approaches its maximum charge. Conversely, the charging current $I_{chg}$ proportionately decreases with increasing $V_{chg}$ such that the charging power delivered to the battery remains generally constant. Prior art chargers have typically either monitored the actual values of the charger voltage $V_{chg}$ or have measured the slope of the charging voltage $V_{chg}$ curve or the difference in the slope of the $V_{chg}$ curve over time, and have turned off the charger in response to such measurements.

While such prior art techniques appear sound in theory, upon closer examination they are found to be significantly inaccurate in determining the proper time at which to stop the battery charging operation in order to optimize the amount of battery overcharge, without damaging the battery or are excessively expensive to produce due to the sophisticated electronics necessary to implement the required small voltage detection circuitry. One problem with such prior art measurement techniques is exemplified in FIG. 2. While the conceptual/diagrammatic chart of FIG. 1 shows the "general" relationship of $V_{chg}$ over time, it does not accurately depict the actual length of time it takes for a typical battery to be charged from its discharged state (time $t_a$) to its fully charged state (time $t_c$). This time period generally represents many hours (typically from 10 to 20 hours) for a battery having a nominal terminal voltage of, for example, 36 volts. In contrast, the time period that is required to "overcharge" the battery beyond its nominal charge (i.e. $t_b - t_c$) is typically a small percentage of the total battery charging time. One can readily appreciate that since the charging voltage ($V_{chg}$) varies only a small amount (on the order of millivolts) during the final overcharging time period, battery charging systems that monitor and measure only the charging voltage in order to determine the end of the charge cycle, if not extremely accurate, can grossly miscalculate the actual charged state of the battery.

A more accurate manner of determining the actual undercharged state of a battery is possible by examining the physical/chemical characteristics of the battery being charged. When a lead-acid type battery is charged, chemical changes occur to the electrolyte within the battery. In particular, the specific gravity of the electrolyte gradually increases as the battery charges toward a maximum value. The maximum specific gravity value of the battery electrolyte is attained when the battery is fully charged. Just prior to attaining full charge, (i.e. as the total charge input to the battery approaches the preceding battery discharge output) there is a rapid change (increase) in the specific gravity of the battery electrolyte, toward its maximum value. At that instant during the charging cycle, the water within the battery cells electrolyzes, and gas is formed. This phenomenon can be electrically detected as a voltage rise at the battery output terminals, as shown at $V_G$ in exaggerated format in FIG. 3. For simplicity in description of that instant of time in the charging cycle of the battery, such point will generally be referred to hereinafter as the gassing point of the battery and generally occurs at the $t_b$ instant of time of the charging curve of FIG. 2. As will be appreciated, since the change in battery voltage at the gassing point of the battery is relatively small as compared to the actual battery output voltage level, and occurs over a relatively short time interval in the overall charging cycle of the battery, it is not readily detectable with the conventional prior art battery charger techniques that simply measure the battery charging voltage or the rate of change of the battery charging voltage.

The present invention addresses the above shortcomings of known prior art battery charging control networks, by accurately detecting the gassing point of a battery during its charging cycle and by accurately continuing to charge the battery after the gassing point thereof has been attained, until an optimum additional predetermined overcharge capacity has been returned to the battery.

SUMMARY OF THE INVENTION

The present invention addresses a number of the problems associated with prior art battery charging networks. The charger control circuit of this invention accurately determines when the gassing point of the battery is reached during the charging cycle and thereafter limits the amount of charge delivered to the battery so as to achieve an optimum but safe overcharge condition of the battery. The battery charger control circuit of this invention first monitors the battery charger charging voltage during the charging cycle until the charging voltage approaches that voltage range wherein the gassing point of the battery is anticipated to occur. As the charging voltage reaches such first voltage threshold level, a pulsed loading circuit is activated, which periodically places a load across the battery and accurately measures the true output voltage of the battery. When the measured pulsed load voltage exceeds a threshold voltage predetermined to be indicative of the battery's entry into its gassing phase, a timing network is activated which ensures that the battery will continue to be charged thereafter for only a predetermined period of time, calculated to safely provide approximately a 5% to 15% overcharge input, and more preferably from about 7% to 12% overcharge input, to the battery. In the event that the measured pulsed load voltage fails to attain the threshold voltage which indicates that the battery has entered its gassing phase after a predetermined time interval following initiation of the loading pulsed measurements, the charger network is automatically turned off, to avoid overcharging damage to the battery. Once the battery is charged following a normal charging operation of the battery to approximately a 10% overcharge level, the control circuitry is reset and continues to monitor the output voltage. In the event that the battery voltage drops below a predetermined maintenance level, the control network will recharge the battery through the normal above-described recharging cycle.

Therefore, according to one aspect of the invention, there is provided apparatus for charging a battery of the type that enters into a gassing phase when full charge is approached, which includes:

(a) means for applying charging current to charging terminals of the battery;

(b) means operatively connected with the battery charging terminals for periodically operatively connecting a load across the battery terminals;

(c) means operatively connected to said load for sensing the electrical response of the load when energized by the battery and for providing a sensed load signal in response thereto;

(d) means operatively connected to receive the sensed load signal for isolating from it that portion of the sensed load signal which is attributable only to energization of the load by the battery;

(e) means operatively connected to receive the isolated sensed load signal for determining therefrom when the battery enters its gassing phase and for producing a gassing phase signal which is indicative of the gassing phase condition of the battery; and (f) means operatively connected with the battery and to receive the gassing phase signal for applying a predetermined overcharge to the battery after the battery has entered into its gassing phase.

According to a preferred embodiment of the invention, the periodic load is applied to the battery terminals on a duty cycle of less than 1%. Further, according to a preferred application of the invention, the sensing means measures the absolute value of the electrical response of the load, and preferably includes a linear amplifier which operates in its linear region to amplify the responsive load signal without saturation. According to a further aspect of the invention, there are also included means operatively connected with the battery terminals for sensing the voltage of the battery terminals during the charging of the battery and for disabling the periodic load connecting means until the voltage at the battery terminals has attained a first predetermined battery voltage which is known to precede that battery terminal voltage at which the battery normally enters into its gassing phase.

According to another aspect of the invention there is provided a circuit apparatus for electrically determining entry of a battery being charged into its gassing region, which includes:

(a) means suitable for connection to the terminals of a battery for periodically operatively applying a load across the battery terminals during charging thereof, wherein a current flow path is established from the battery terminals and through the load;

(b) sensor means operatively connected to the load for producing a sensed signal responsive to current flow through the load;

(c) means operatively connected to receive the sensed signal for isolating from it that portion of the sensed signal which is attributable only to the current flow through the load which is caused by the battery and for producing an isolated sensed signal in response thereto; and (d) means operatively connected to receive the isolated sensed signal and the threshold signal for comparing the isolated sensed signal with the threshold signal, and for producing a comparison signal in response thereto which is indicative of whether the battery has entered into its gassing phase.

According to yet another aspect of the invention, there is provided a method of charging a battery of the type that enters into a gassing phase as full charge of the battery is approached, which includes the steps of:

(a) applying a charging current to the terminals of the battery;

(b) periodically operatively applying an electrical load to the battery;

(c) obtaining a responsive signal from the load when it is operatively connected to the battery;

(d) isolating from the load responsive signal that portion of it which is attributable only to energization of the load by the battery;

(e) determining entry of the battery into its gassing phase from the isolated load responsive signal; and (f) applying a predetermined overcharge to the battery after the battery enters into its gassing phase.

According to yet another aspect of the invention, there is provided a method of determining entry of a lead-acid type battery being charged into its gassing phase, which includes the steps of:

(a) applying a resistive load across the battery terminals at periodic predetermined intervals of time during the charging cycle, wherein the length of the intervals is less than about 10% of the anticipated time required to maximize overcharge of the battery during its gassing phase;

(b) monitoring the voltage level caused at the resistive load;

(c) isolating the battery component of the monitored voltage level signal from other signal components which comprise the monitored voltage level;

(d) comparing the isolated load signal with a predetermined threshold value signal; and (e) determining entry of the battery into its gassing phase based on such comparison.

While the present invention will be described with respect to its applicability to batteries of the lead-acid type, it will be understood that the invention is not limited to use with such batteries, but can be used with any type of battery that is characterized by having a gassing phase just prior to attaining full charge thereof. Further, while specific circuit configurations will be described in reference to a preferred embodiment of the invention, it will be understood that the invention is not limited to such circuit configurations or components or values described with reference to the preferred embodiment, but that all alternative embodiments and configurations which fall within the broad scope of the claims are covered. Further while the invention will be described with respect to its applicability in charging a battery of a given voltage and a given number of cells, it will readily be understood by those skilled in the art that the invention is not limited to the particular size of or number of cells within the battery. The principles of this invention apply to batteries of any size or voltage. Further, while particular "prediction" values have been used in configuring the circuit networks which comprise the preferred embodiment of the invention, those skilled in the art will readily recognize that other such prediction values, threshold limits, and the like could equally well be employed within the scope of this invention.

BRIEF DESCRIPTION OF THE DRAWING

Referring to the Drawing, wherein like numerals represent like parts throughout the several views.

DESCRIPTION OF THE PREFERRED EMBODIMENT

Figure 1:
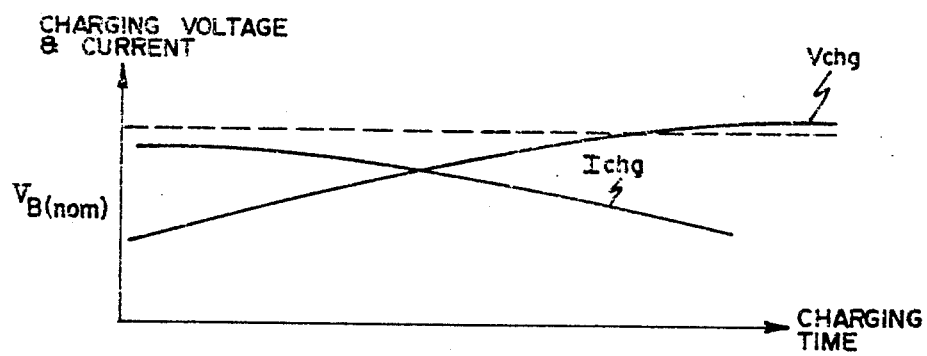
FIG. 1 is an unscaled graphical representation of charging voltage and current curves as they appear during a battery charging operation for a typical lead-acid type battery.
Figure 2:
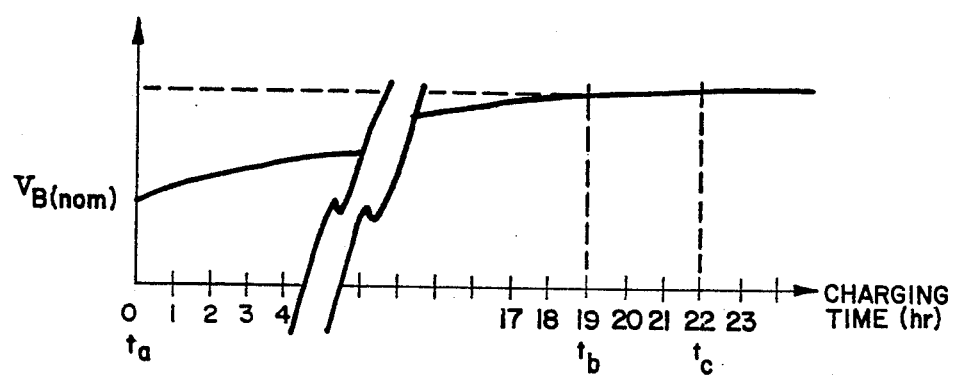
FIG. 2 is an expanded graphical representation of the battery voltage variation of a typical lead-acid type battery as it appears during a battery charging operation.
Figure 3:
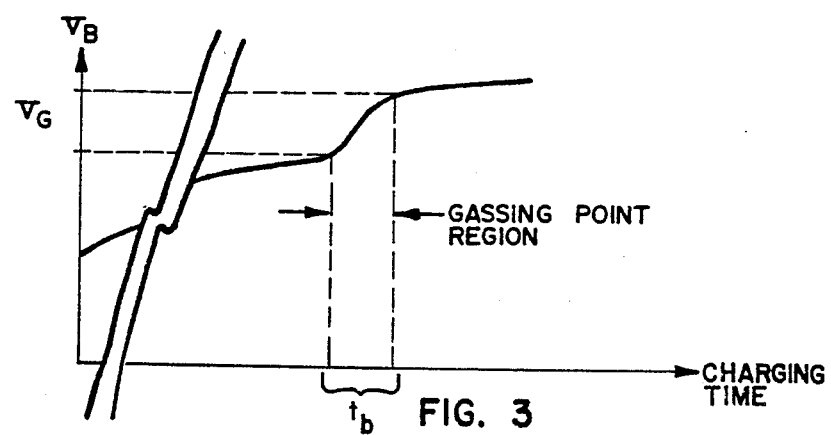
FIG. 3 is an enlarged graphical representation of the battery terminal voltage of FIG. 2 as it would appear during the gassing point region of the battery.
Figure 4:
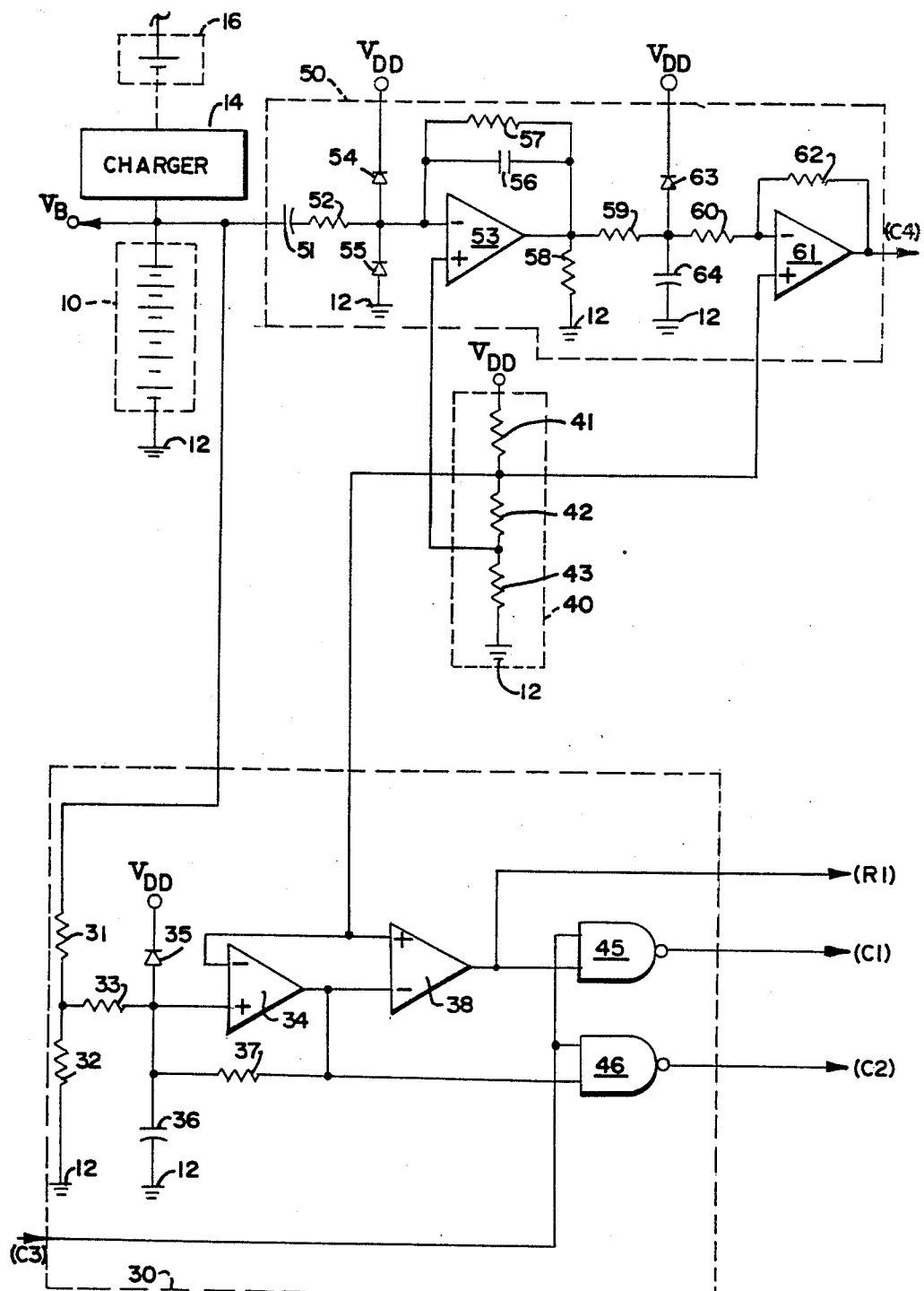
FIG. 4 is an electrical schematic diagram of a first portion of a preferred embodiment of a battery charging control network apparatus constructed according to the principles of this invention, and includes the battery charging voltage and battery output voltage monitoring portions of the apparatus.
Figure 5:
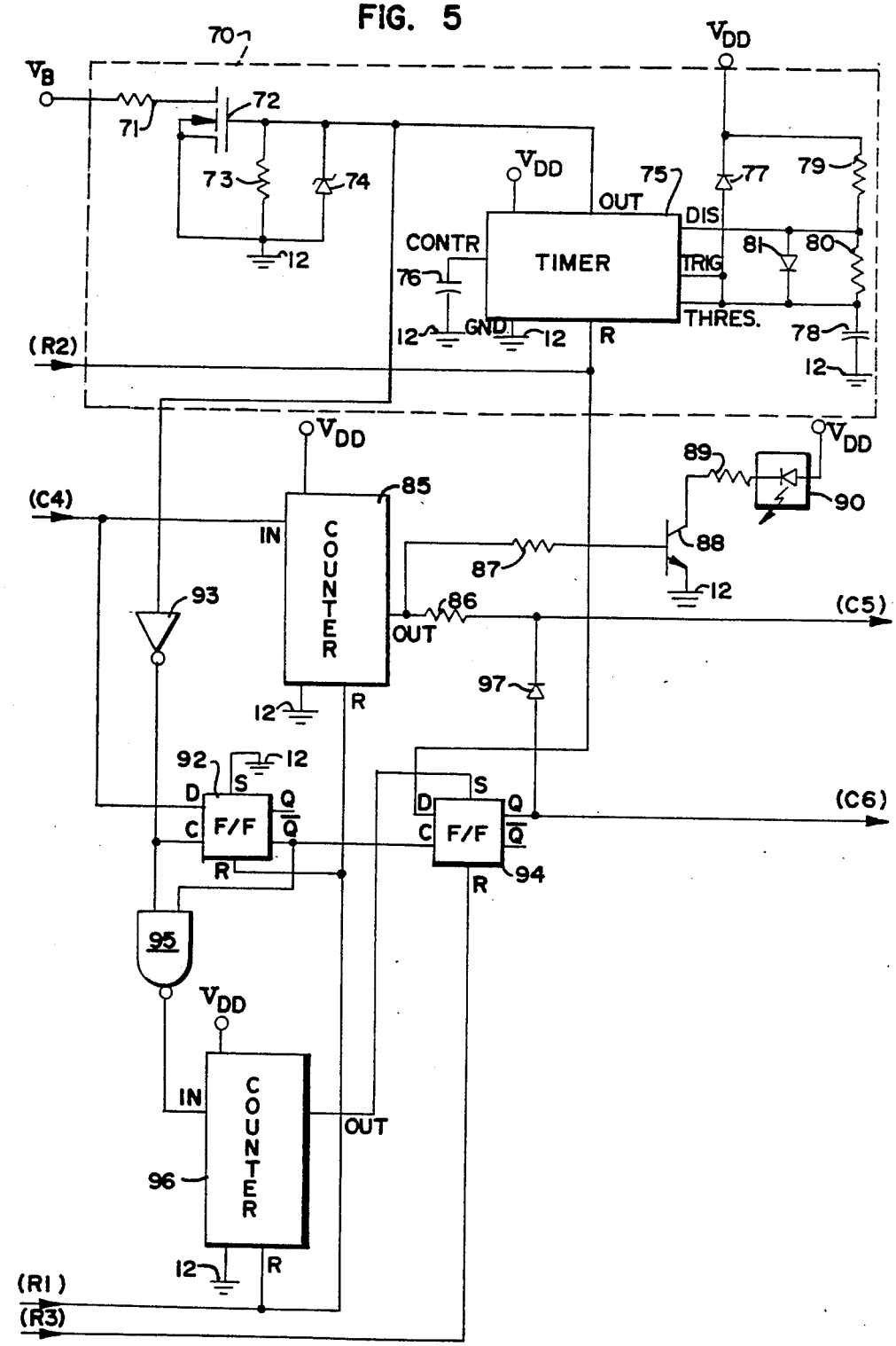
FIG. 5 is an electrical schematic diagram of a second portion of the battery charging control network apparatus of the preferred embodiment.
Figure 6:
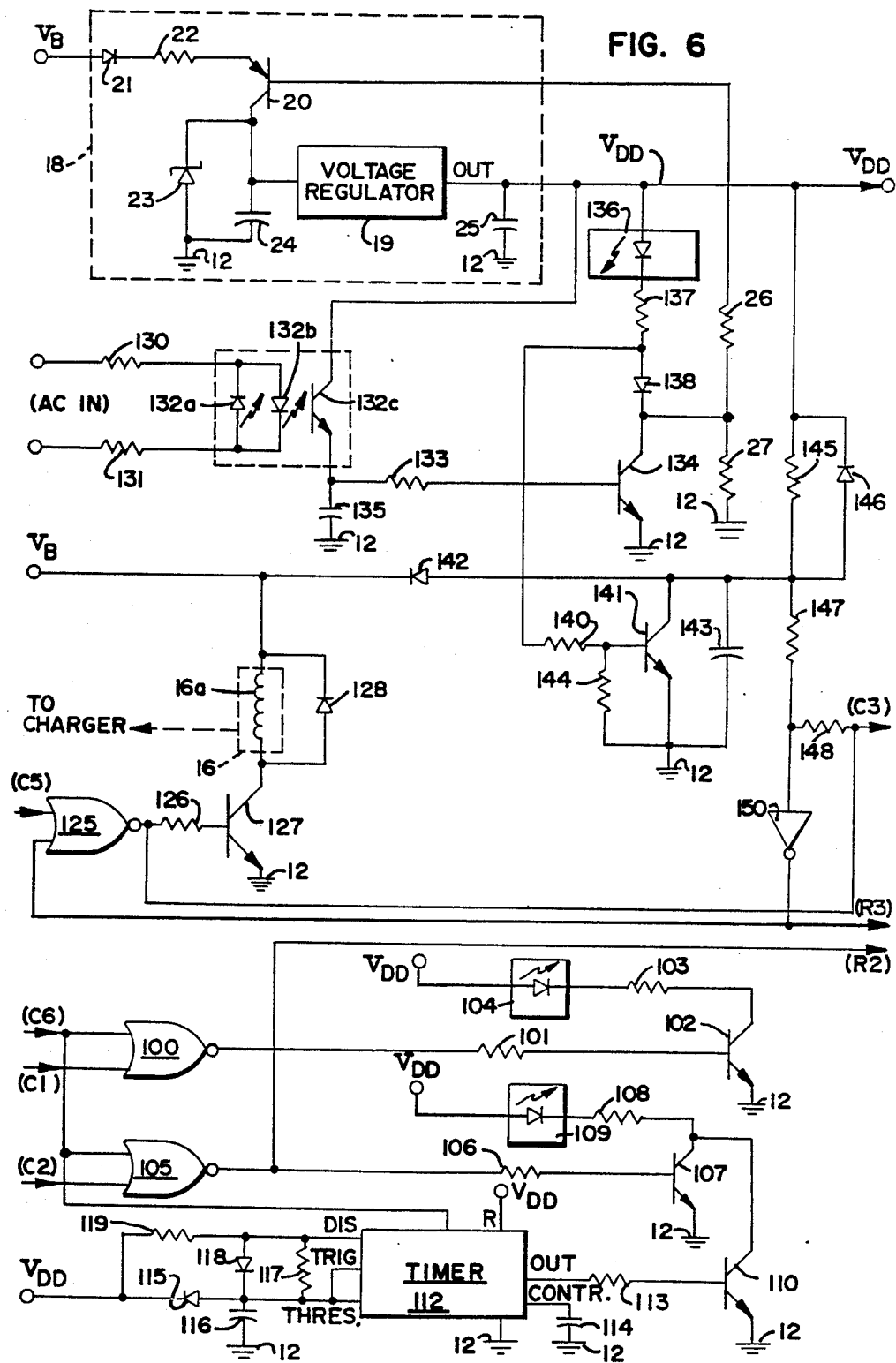
FIG. 6 is an electrical schematic diagram of a third portion of the battery charging control network apparatus of the preferred embodiment of the invention, wherein FIGS. 4 through 6 collectively comprise a complete schematic diagram of a battery charger control network of a preferred embodiment of the invention.

Referring to the Drawing, FIGS. 4 through 6 when operatively interconnected, comprise a circuit network of a battery charger apparatus configured according to the principles of this invention. It will be understood that where standard circuit components are illustrated in the Drawing, such components are properly operatively connected to the logic and common buses and where additionally required (i.e. such as compensation filtering networks and the like), are also properly connected so as to make such components operatively functional for their intended purposes. Further, while specific types of circuit components and configurations of electrical components will be described to implement various functions of the invention in the preferred embodiment, it will be understood that other circuits and types of circuit components could equally well be used to achieve the purposes of this invention.

Referring to FIG. 4, a Battery Network, generally indicated at 10 is illustrated. The Battery Network 10 may represent a single battery or a plurality of batteries (such as in a battery pack) to be charged. Typically, batteries within a battery pack are connected in series for charging purposes. The batteries within the Battery Network 10, are preferably of the lead-acid type which display the charging phenomenon previously referred to herein as reaching a "gassing point" during their charging cycle. The positive terminal of the Battery Network 10 forms the voltage level referred to throughout the Drawing as ($V_B$), and the negative terminal of the Battery Network 10 is connected throughout the circuit schematics to a common 12 and forms the common voltage potential for the electrical circuits hereinafter described.

The Battery Network 10 is charged by means of an appropriate battery charger, illustrated in FIG. 4 at 14. In the preferred embodiment, the Charger 14 is of a ferro-resonant type, but could be of any appropriate configuration suitable for charging the batteries of the Battery Network 10. The Charger is energized in either a "charging" or an "off" mode by means of a relay, generally designated in dashed lines at 16. The relay is controlled by means of a battery charging control network as described in more detail hereinafter.

The logic voltage ($V_{DD}$) for energizing the circuit components within the battery charger control network of this invention is established by means of a power supply circuit generally designated at 18 in FIG. 6. Referring thereto, the $V_{DD}$ voltage level employed by the circuit components within the preferred embodiment is 15 volts, and is applied to circuit components by means of the logic bus designated as $V_{DD}$. The $V_{DD}$ logic voltage is generated by means of a 15 volt ±1% Voltage Regulator 19 which in the preferred embodiment, is a type 780 voltage regulator. The input of the Voltage Regulator 19 is connected to the collector of a pnp transistor 20. In the preferred embodiment, transistor 20 is of a type MPS A56 transistor. The $V_B$ battery voltage is applied by means of a diode 21 in series with a resistor 22 to the emitter of transistor 20. A 30 volt zener diode 23 is connected in parallel with a capacitor 24 between the input terminal of the voltage regulator 19 and the common 12. A capacitor 25 is connected between the output terminal of the voltage regulator 19 and the common 12. The base of transistor 20 is connected to the common 12 by means of a pair of series connected resistors 26 and 27.

Referring to FIG. 4, the battery network voltage ($V_B$) is applied to a First Battery Voltage Monitoring Network, generally designated at 30. The battery voltage $V_B$ is divided by means of a pair of series connected one percent resistors 31 and 32, connected to the common 12. The reference voltage established at the juncture of resistors 31 and 32 is applied by means of a third resistor 33 to the noninverting input terminal of an Amplifier 34. Although not illustrated in the figures, it will be understood that Amplifier 34, as well as other amplifiers and logical gates described hereinafter, are appropriately connected to the logic supply and to the common for proper operation. The noninverting input terminal of Amplifier 34 is also connected by means of a diode 35 to the logic voltage ($V_{DD}$) and by means of a capacitor 36 to the common 12. A feedback resistor 37 is connected between the output and noninverting input terminals of the Amplifier 34. The output terminal of Amplifier 34 is also connected to the inverting input terminal of a second Amplifier 38.

In the preferred embodiment, the Amplifiers 34 and 38 are each one-fourth of a type LM324 quad operational amplifier, well known in the art. The noninverting input terminal of Amplifier 38 and the inverting input terminal of Amplifier 34 are connected to receive a 7.5 volt reference voltage from a Voltage Divider Network generally designated at 40. The voltage divider network 40 comprises three one percent resistors 41, 42 and 43 connected in series between the $V_{DD}$ logic supply and the common 12, and having signal output connections at their respective junctures. The 7.5 voltage reference signal output from the Voltage Divider Network 40 is established at the juncture of resistors 41 and 42. The voltage level output established at the juncture of resistors 42 and 43 of the Voltage Divider Network 40 is in the preferred embodiment, 2.2 volts.

The signal output from Amplifier 38 is directly connected to a first input terminal of a NAND gate 45 and is provided as a First Reset Signal (R1) to circuit components to be described hereinafter in more detail. The signal output of NAND gate 45 is applied by means of a signal flow path (C1) to circuit components to be described hereinafter in more detail.

The signal output of Amplifier 34 is connected to a first input terminal of a NAND gate 46. The signal output of NAND gate 46 is applied by means of a signal flow path (C2) to circuit components to be described hereinafter in more detail. The second input terminals of NAND gates 45 and 46 are connected to receive signals by means of a signal flow path (C3) originating in circuit components within FIG. 6 of the battery charger control network, yet to be described.

A Battery Voltage Pulse Detector Network 50 (FIG. 4) is connected to monitor the effect of pulsed loads (described in more detail hereinafter) applied to the Battery Network 10 as the gassing point of the Battery Network is approached, and during the gas discharge phase of the Battery Network. The Battery Network voltage ($V_B$) is applied by means of a coupling capacitor 51 in series with a resistor 52 to the inverting input of an Amplifier 53. A pair of input protection diodes 54 and 55 connect the inverting input terminal of Amplifier 53 to the logic voltage ($V_{DD}$) and the common 12, respectively. A capacitor 56 connected in parallel with a resistor 57 between the signal output and inverting input terminals of Amplifier 53 provide a low pass filter for signals applied to the inverting input terminal. The noninverting input terminal of Amplifier 53 is connected to receive the 2.2 volt reference signal from the Voltage Divider Network 40. A resistor 58 is connected between the signal output terminal of Amplifier 53 and the common 12.

The signal output terminal of Amplifier 53 is connected by means of a resistor 59 in series with a resistor 60 to the noninverting input terminal of a Comparator amplifier 61. In the preferred embodiment, amplifiers 53 and 61 are each one-fourth of a type LM324 quad amplifier. A feedback resistor 62 is connected between the signal output and the noninverting input terminals of Amplifier 61. The inverting input terminal of Amplifier 61 is connected to receive the 7.5 voltage signal of the Voltage Divider Network 40. A diode 63 and a capacitor 64 respectively connect the juncture of resistors 59 and 60 with the logic voltage $V_{DD}$ and common 12 respectively. The signal output from Amplifier 61 is applied by means of a signal flow path designated as (C4) to circuitry hereinafter described in FIG. 5.

Referring to FIG. 5, a Pulse Generating/Load Network is generally illustrated at 70. The positive battery terminal of the Battery Network 10 is connected by means of a load resistor 71 to the drain of a MOSFET transistor 72. The source of transistor 72 is connected to the common 12. In the preferred embodiment, transistor 72 is an IRF540-type transistor. A resistor 73 is connected in parallel with an 18 volt zener diode 74 between the gate of transistor 72 and the common 12 for protecting the transistor against excessive voltage signals.

A Timer Network 75 is operatively connected to provide pulses to the gate of transistor 72. In the preferred embodiment, the Timer Network 75 is one-half of a type 556 dual timing circuit, well known in the art, and has its output terminals operatively connected so as to provide 700 millisecond output pulse signals to the gate of transistor 72, once every five minutes. As illustrated in FIG. 5, the Timer 75 is operatively connected to the $V_{DD}$ logic voltage and to the common 12, and has its "control voltage" input terminal connected to the common 12 by means of a capacitor 76. The "trigger" and "threshold" terminals of the timer 75 are connected by means of a diode 77 to the logic voltage $V_{DD}$, and are also connected by means of a capacitor 78 to the common 12. The "discharge" output terminal of the timer 75 is connected by means of a resistor 79 to the $V_{DD}$ logic voltage and by means of a resistor 80 in series with the capacitor 78 to the common 12. A diode 81 is connected between the "discharge" and the "threshold" terminals. The "reset" input terminal of Timer 75 is connected to receive a reset signal from a signal flow path (R2) derived from circuits to be hereinafter described.

The signal output from Amplifier 61 (FIG. 4) is carried by means of the signal flow path (C4) to the input terminal of a Counter 85 (FIG. 5). In the preferred embodiment, Counter 85 is a type CD4020 CMOS 14-stage ripple-carry binary counter that is configured to provide an output signal at its "output" terminal after accumulating a count of 32 pulses received at its input terminal. The Counter 85 is appropriately connected for operation to the $V_{DD}$ logic voltage and to the common 12, as illustrated in FIG. 5. The "output" terminal of Counter 85 is connected by means of a resistor 86 to a signal flow path (C5), and by means of a resistor 87 to the base of an npn transistor 88. The emitter of transistor 88 is connected to the common 12, and its collector is connected by means of a resistor 89 in series with a light-emitting diode (LED) 90 to the logic voltage $V_{DD}$.

The output signal from Amplifier 61 is also applied by means of the signal flow path (C4) to the (D) input terminal of a CD4013 "D"-type flip-flop 92. The signal output from Timer 75 is applied by means of an inverter 93 to the "clock" (C) input terminal of flip-flop 92. The "set" (S) terminal of flip-flop 92 is connected to the common 12. The (Q) output terminal of flip-flop 92 is unconnected, and the ($\overline{Q}$) output terminal of flip-flop 92 is connected to the "clock" (C) input terminal of a second "D"-type flip-flop 94.

The signal output from Timer 75 is also connected by means of the inverter 93 to a first input terminal of a NAND gate 95. The ($\overline{Q}$) output terminal of flip-flop 92 is also connected to the second input terminal of NAND gate 95. The signal output from NAND gate 95 is connected to the input terminal of a second type CD4020 binary counter 96. In a preferred embodiment, counter 96 is also configured as a 32 pulse counter for providing an output signal at its "output" terminal after receiving 32 input pulses at its input terminal. Counter 96 is appropriately operatively connected to the $V_{DD}$ logic and the common buses respectively, as indicated in the schematic diagram. The signal output terminal of counter 96 is connected to the "set" (S) input terminal of flip-flop 94. The (D) input terminal of flip-flop 94 is connected to receive signals from a signal flow path (R2). The ($\overline{Q}$) signal output of flip-flop 94 is unconnected, and the (Q) signal output of flip-flop 94 is connected by means of a diode 97 to the signal flow path (C5) and is directly connected to provide signals to a signal flow path (C6).

The "reset" (R) input terminals of Counters 85 and 96, and the "reset" (R) input terminal of flip-flop 92 are commonly connected to receive a reset input signal by means of the signal flow path (R1) from Amplifier 38 (FIG. 4). The "reset" (R) input terminal of flip-flop 94 is connected to receive a reset signal from a signal flow path (R3).

Referring to FIG. 6, the signal from the (Q) output terminal of flip-flop 94 is applied by means of the signal flow path (C6) to a first input terminal of a NOR gate 100. The second input terminal of NOR gate 100 is connected to receive the output signal from NAND gate 45 by means of the signal flow path (C1). The output terminal of NOR gate 100 is connected by means of a resistor 101 to the base of an npn transistor 102. The emitter of transistor 102 is connected to the common 12, and its collector is connected by means of a resistor 103 in series with an LED 104 to the logic voltage $V_{DD}$).

The output signal from the (Q) output terminal of flip-flop 94 is also connected by means of the signal flow path (C6) to a first input terminal of a NOR gate 105. The second input terminal of NOR gate is connected to the output terminal of NAND gate 46 by means of the signal flow path (C2). The output terminal of NOR gate 105 is directly connected to provide second reset signals to the signal flow path (R2), and is connected by means of a resistor 106 to the base of an npn transistor 107. The emitter of transistor 107 is connected to the common 12, and its collector is connected by means of a resistor 108 in series with an LED 109 to the logic voltage $V_{DD}$). The collector of transistor 107 is also directly connected to the collector of an npn transistor 110.

The (Q) output terminal of flip-flop 94 is also connected by means of the signal flow path (C6) to the "reset" (R) input terminal of a second Timer Network 112. In a preferred embodiment, the Timer 112 is a type 556 dual timer and is operatively connected to provide periodic pulses, when activated, to the base of transistor 110 through a resistor 113. Timer 112 is appropriately connected to the logic and the common buses, as indicated. The "control" input terminal of Timer 112 is connected by means of a capacitor 114 to the common 12. The "trigger" and "threshold" input terminals of Timer 112 are connected by means of a diode 115 to the logic voltage ($V_{DD}$), and by means of a capacitor 116 to the common 12. A resistor 117 in parallel with a diode 118 are connected between the "discharge" and the "threshold" output terminals of Timer 112, and the "discharge" output terminal of Timer is further connected by means of a resistor 119 to the $V_{DD}$ logic voltage. The emitter of transistor 110 is directly connected to the common 12.

The output signal from Counter 85 is applied by means of the signal flow path (C5) to a first input terminal (FIG. 6) of a NOR gate 125. The signal output terminal of NOR gate 125 is connected by means of a resistor 126 to the base of an npn transistor 127. The emitter of transistor 127 is directly connected to the common 12. In the preferred embodiment, transistor 127 is a type MPSA06 transistor. The collector of transistor 127 is connected to energize the coil 16a of the relay 16 that controls the On/Off charging operation of the battery charger 14 (FIG. 4). The relay coil 16a is energized by the signal flow path established from the positive Battery Network terminal ($V_B$), through the coil 16a, to the collector of transistor 127. A protection diode 128 is connected across the relay 16 as indicated in FIG. 6. The signal output from NOR gate 125 is also directly connected to the signal flow path (C3), leading to the NAND gates 45 and 46 of FIG. 4.

An AC power source is connected across the pair of terminals indicated at (AC IN) in FIG. 6. The AC terminals are connected by means of a pair of resistors 130 and 131 connected in series with a pair of LED's 132a and 132b of a H11AA1 optocoupler 132. The diodes 132a and 132b optically activate the phototransistor 132c to provide an output signal at the emitter of transistor 132c, which is connected by means of a resistor 133 to the base of an npn transistor 134. The collector of transistor 132c is directly connected to the logic voltage ($V_{DD}$). The emitter of transistor 132c is also connected by means of a capacitor 135 to the common 12.

The emitter of transistor 134 is connected to the common 12, and its collector is connected to the juncture of resistors 26 and 27. An LED signal diode 136 is connected in series with a resistor 137 and a diode 138 between the logic voltage $V_{DD}$ and the collector of transistor 134.

The series combination of LED 136 and resistor 137 is also connected in series with a resistor 140 to the base of an npn transistor 141. The collector of transistor 141 is connected by means of a diode 142 to the positive battery terminal ($V_B$) of the Battery Network 10 and is also connected by means of a capacitor 143 to the common 12. The emitter of transistor 141 is connected to the common 12, and a resistor 144 is connected between the base of transistor 141 and the common 12. The collector of transistor 141 is also connected by means of a parallel combination of a resistor 145 and a diode 146 to the logic voltage $V_{DD}$, and is further connected by means of series-connected resistors 147 and 148 to the signal flow path (C3). The collector of transistor 141 is also connected by means of the resistor 147 and an inverter 150 to the Third Reset signal flow path (R3) which carries signals for resetting flip-flop 94, and which is also connected to the second input terminal of the NOR gate 125.

Operation of the Preferred Embodiment

The operation of the battery charger control network collectively illustrated in FIGS. 3-6 is as follows. It should be noted that while the circuits of the preferred embodiment include various features such as visual indicators which portray different states of operation of the circuitry, such features are not necessary to and do not form a part of the invention. Further, those skilled in the art will readily recognize other techniques and circuits for accomplishing the claimed features of the invention.

The battery charger control circuitry is inoperative unless the charging network is electrically connected to both the Battery Network 10 terminals (i.e. to $V_B$) and to the AC supply terminals (indicated by AC IN) The AC supply also energizes Battery Charger network 14 of FIG. 4. Referring to FIG. 6, when the battery charger control network is operatively connected to $V_B$, a current path will be established from the $V_B$ supply bus, through diode 21, resistor 22, the emitter-base junction of transistor 20 and the resistors 26 and 27, to the common 12. This current flow, however, will not be adequate to fully turn on transistor 20 or the Voltage Regulator 19 for providing a full scale $V_{DD}$ logic voltage, until transistor 134 is turned on. Transistor 134 will remain off until phototransistor 132c is energized by LED's 132a and 132b which occurs when the AC IN terminals are appropriately connected to an AC supply source. When the AC IN terminals are connected to an AC supply, the photodiodes 132a and 132b energize the phototransistor 132c, which provides base drive for transistor 134. The voltage appearing at the output of the Voltage Regulator 19 and also at the collector of transistor 134 is adequate to enable transistor 134 to turn on and to provide a base drive for transistor 20, thereby fully enabling the Voltage Regulator 19 to provide a full $V_{DD}$ logic voltage to the circuit components throughout the control network. As soon as $V_{DD}$ reaches full potential and transistor 134 is turned on, the light emitting diode 136 will be energized, indicating that AC power is being appropriately provided to the circuitry and that the circuitry is appropriately operatively connected to the Battery Network 10 terminals.

While not described in detail herein, it will be understood by those skilled in the art that the logic circuits of the battery charger control network are appropriately connected and arranged so as to provide proper initialization and shutdown conditions—upon energization and deenergization thereof so as to render them operative in their intended manner.

When the battery charger control network is not connected to the battery terminal ($V_B$) and to the AC power source, the Charger 14 will not be enabled by relay 16 to charge the battery 10. When the battery charger circuit is appropriately connected to $V_B$ and to the AC power source as described above, the voltage level of $V_{DD}$ will rise to its full value, charging capacitor 143 through resistor 145, establishing a logical high signal at the input of inverter 150 and providing a logical low input signal to NOR gate 125. The output of NOR gate 125 switches to a logical high, turning on transistor 127 and energizing the coil 16a, thereby enabling Charger 14 to charge the Battery Network 10. Transistor 141 is operative in the event of AC failure, to immediately deenergize the relay coil 16a. In the event of AC failure, transistor 141 is turned on, thereby shorting to ground capacitor 143, which drops the signal level to the input of inverter 150, thereby providing a logical high switching signal to NOR gate 125, to turn off transistor 127 and de-energize relay 16a. In the event that the Battery Network 10 is disconnected, capacitor 143 immediately discharges through diode 142, providing a switching signal through inverter 150 and NOR gate 125 to disable the relay coil 16a.

Once the charging cycle has been initiated, the input signals to NOR gate 125 both appear at a logical "low", causing a logical "high" signal at its output. At the same time the signal flow path (R3) provides a "low" enabling signal to the "reset" input terminal of flip-flop 94.

During the initial portion of a normal charging cycle, the Q output terminal of flip-flop 94 appears at a logical low level. The logical low Q output signal of flip-flop 94 will be maintained until either a logical "high" data signal is clocked through the flip-flop, or a logical "high" signal is applied to the "set" input terminal, under conditions hereinafter described in more detail. Whenever the Q output signal of flip-flop 94 switches to a logical "high", NOR gate 125 will provide a logical "low" signal to the base of transistor 127, deenergizing the relay coil 16a.

Once the relay coil 16a has been energized, activating the Battery Charger 14, initial charging of the battery is monitored by the First Battery Voltage Monitoring Network 30 (FIG. 4). Network 30 is particularly applicable for use with lead-acid type batteries which display very predictable charging characteristics. For a given battery size and configuration, the battery terminal voltage level at which the battery enters into its gassing phase can be fairly accurately predicted. The function of Network 30 is to determine when the charge level of the battery being charged reaches a predetermined level that (based on the predictable nature of the battery) is known to represent a point on the battery's charging curve that exists just prior to the battery's gassing phase. Network 30 performs its functions by continuously monitoring the battery terminal voltage during the charging operation. The charging voltage ($V_{chg}$) appearing at the positive terminal of the Battery Network 10 establishes current flow through the resistor divider network comprising resistors 31 and 32, establishing a measured voltage level at the juncture of resistors 31 and 32, which is applied to the noninverting input terminal of Amplifier 34. The inverting input terminal of Amplifier 34 is connected to receive a voltage reference level from the voltage divider 40, wherein Amplifier 34 acts as a comparator to compare the voltage level applied to its noninverting input against the reference voltage applied to its inverting input terminal. The voltage divider circuit comprising resistors 31 and 32 is configured in relation to the voltage divider network 40 based on known past history experience with the type of battery being charged such that when the charging voltage applied to the Battery Network 10 (i.e. $V_B$) reaches the predetermined threshold voltage level, the Battery Network is approaching entry into its gassing phase. For example, when the battery charging control circuit is used to charge a lead-acid battery having a nominal terminal voltage of 36 volts, the input resistor network comprising resistors 31 and 32 is configured relative to the voltage divider network 40 such that the voltage levels applied to the inverting and noninverting input terminals of Amplifier 34 will be identical when the charging voltage applied to the battery is approximately 42 volts.

It will become apparent upon a more detailed description of the operation of the invention that the predictability simplification offered by the First Battery Voltage Monitoring Network 30 could be eliminated if one desired to continuously monitor the battery characteristics for entry of the battery into its gassing phase. However, the predictable nature of the lead-acid type of battery enables significant simplification to be made to the battery voltage monitoring circuits by use of a circuit such as Network 30.

Prior to a correspondence in voltage levels applied to the input terminals of Amplifier 34, the output of Amplifier 34 will appear at a logical "low" level. Upon application of a voltage signal to the noninverting input terminal of Amplifier 34, which meets or exceeds the reference voltage level applied to its inverting input terminal, the output of Amplifier 34 will switch to a logical "high", which when applied to the inverting input terminal of Amplifier 38 causes the normally "high" signal output of Amplifier 38 to switch to a logical "low" signal. Therefore, during the initial charging phase of the Battery Network 10, Amplifiers 34 and 38 operate to provide a logical "high" input to NAND gate 45, which when coupled with the logical "high" provided to the second input terminal of NAND gate 45 from the input voltage detection circuitry previously described, energize NAND gate 45 so as to produce a logical "low" signal at its output. This signal is applied by means of the signal flow path (C1) to one input terminal of the NOR gate 100. The second signal input of NOR gate 100 is connected to receive the logical "low" signal level from the Q output terminal of flip-flop 94 by means of the signal flow path (C6), thereby setting the signal output of NOR gate 100 at a logical "high". The "high" output signal of NOR gate 100 drives transistor 102 on, energizing LED 104, which provides a visual indication that the battery charger control network is operating in its "initial" charging cycle of the Battery Network 10, preceding its gassing phase. At the same time that LED 104 is energized, LED 109 is de-energized since NAND gate 46 provides a logical "high" output signal to NOR gate 105, causing the signal output of NOR gate 105 to provide a logical low level to the base of transistor 107, thereby maintaining transistor 107 in an "off" mode of operation. At the same time, the logical "high" signal output of Amplifier 38 provides an enabling reset signal by means of the First Reset line (R1) to the reset input terminals of flip-flop 92 and Counters 85 and 96. The logical "low" signal output level of NOR gate 105 applies a disabling signal to the Second Reset line (R2) to the Timer 75 and a logical "low" signal level to the "data" input terminal of flip-flop 94.

After the Battery Network 10 has been charged through the predetermined initial charging period (corresponding to the rise of $V_B$ to the predetermined threshold level detected by Amplifier 34), the logical "high" input signal applied to the inverting input terminal of Amplifier 38 causes the signal output of Amplifier 38 to switch to a logical "low" level, switching the signal output of NAND gate 45 to a logical "high" and causing the signal output of NOR gate 100 to switch to a logical "low" to de-energize transistor 102 and LED 104. Simultaneously, the logical "high" signal output from Amplifier 34 coupled with the "high" input signal from signal flow path (C3) causes the output of NAND gate 46 to switch to a logical "low" switching the output of NOR gate 105 to a logical "high" to turn on transistor 107 and energize LED 109 in a steady state of operation. LED 109 indicates that the initial charging phase of the battery has been completed, and that the gassing point of the battery is being approached. When the signal output of NOR gate 105 switches to a logical "high", Timer 75 is enabled and a logical "high" signal input is available at the "data" input terminal of flip-flop 94.

As stated above, the predictable nature of lead-acid type batteries has allowed one to "generally" predict entry of a battery into its gassing phase. However, the prior art has not adequately been able to accurately and economically determine the "exact" instant of time during the charging cycle at which the battery enters its gassing phase. While circuitry such as Network 30 is useful to generally predict when the gassing point will occur, it cannot accurately determine when the gassing phase actually begins. The circuitry hereinafter described provides a simple and relatively inexpensive method of accurately determining the exact point at which the battery begins its gassing phase for maximizing overcharge input into the battery during the gassing phase.

The First Battery Voltage Monitoring Network 30 continues to monitor the output battery terminal voltage ($V_B$) in addition to the pulse activated circuitry to be hereinafter described. Upon receipt of the enabling reset signal at its "reset" input terminal, Timer 75 begins to produce output pulses at its signal output terminal on a continuous periodic time cycle. In the preferred embodiment, Timer 75 provides a signal of approximately 700 milliseconds, approximately once every five minutes. The output pulse from Timer 75 gates transistor 72 into a conducting mode, placing resistor 71 as a load, across the Battery Network 10 terminals for the duration of the 700 millisecond pulse. In the preferred embodiment for charging a 36 volt battery, resistor 71 is set at a low resistance value so as to establish approximately a 10 ampere load to the battery during the 700 msec pulse interval. The output pulse from Timer 75 also provides a clock pulse signal to flip-flop 92 through inverter 93 and an input pulse signal to Counter 96 through NAND gate 95. As long as a pulse data signal is not received at the "data" input terminal of flip-flop 92 from the (C4) signal flow path during the clocking pulse interval, NAND gate 95 will be enabled so as to pass pulse input signals to Counter 96. Counter 96 continues to accumulate a count of received input pulses until a predetermined number of such pulses have been received. In the preferred embodiment, Counter 96 has been selected to accumulate a count of 32, and acts as a timing control network to provide an output signal to the "set" input terminal of flip-flop 94 160 minutes following receipt of its first input pulse signal. When Counter 96 has timed-out and applies a "set" signal to flip-flop 94, the Q signal output of flip-flop 94 switches to a logical "high" disabling transistor 107 through NOR gate 105 and enabling Timer 112 to produce a periodic energizing signal to transistor 110, causing LED 109 to be activated in an intermittent or flashing mode. LED 109, when flashing, indicates that the battery charger control network has operated for a predetermined time interval (as established by Counter 96) after the Battery Network 10 had been charged to the predetermined threshold voltage detected by the First Battery Voltage Monitoring Network 30, without detection of the battery gassing phase, as hereinafter described in more detail. Therefore, if Counter 96 is permitted to time-out and to provide a "set" input signal to flip-flop 94, the battery charger control circuit was not able to detect entry of the Battery Network into its gassing phase of operation. In such event, flip-flop 94 causes the relay coil 16a to be de-energized, which turns off the battery charger 14 so as to prevent overcharge damage to the Battery Network 10 until an operator can discern the reason for failure of the network to detect the Battery Network gas discharge phase.

It will be noted that throughout the counting phase of pulse load signals, due to flip-flop 92 and NAND gate 95, only one or the other of Counters 96 and 85 will be operable at any instant of time. Any input pulse signals applied to the input of Counter 85 by means of the signal flow path C4 will automatically cause further input signals to Counter 96 to be blocked. Counter 85 receives its input pulse signals to be counted from the Battery Voltage Pulse Detector Network 50 (FIG. 4).

Referring to FIG. 4, the Battery Voltage Pulse Detector Network 50 is operative to continuously monitor the load voltage level which appears at the Battery Network 10 terminal ($V_B$) when the load resistor 71 is applied across the battery terminals during the output pulse of Timer 75. In order to accurately monitor the measured load voltage, it is important to filter out from the measured signal the large battery terminal voltage and all other extraneous noise signals, since such signals could easily mask the measured load voltage signal that indicates when the battery enters its gassing phase. The nominal battery voltage level is blocked by capacitor 51 such that only the voltage difference at the $V_B$ terminal resulting from the application of the resistive 71 load thereto passes to the inverting input terminal of amplifier 53. The resistor 57/capacitor 56 network acts as a low-pass filter to attenuate the AC ripple voltage of the Charger 14, but does not affect the 700 millisecond wide load signals being monitored by the amplifier network. The diodes 54 and 55 act as protection diodes for the inverting input of Amplifier 53. The noninverting input of Amplifier 53 is connected to a 2.2 v bias voltage from voltage divider network 40. Amplifier 53 continuously monitors the effect of the pulsed load applied to the battery terminals and is operative in its linear range to amplify, without saturation, the absolute value of the pulse signal applied to its inverting terminal. Amplifier 53 has, in the preferred embodiment, a gain of $10^3$ and has its noninverting input terminal set at a 2.2 volt bias level. As the battery charging progresses, little change is noted in the voltage drop across the load resistor 71 until the "gassing point" of the battery is reached.

Figure 7A:
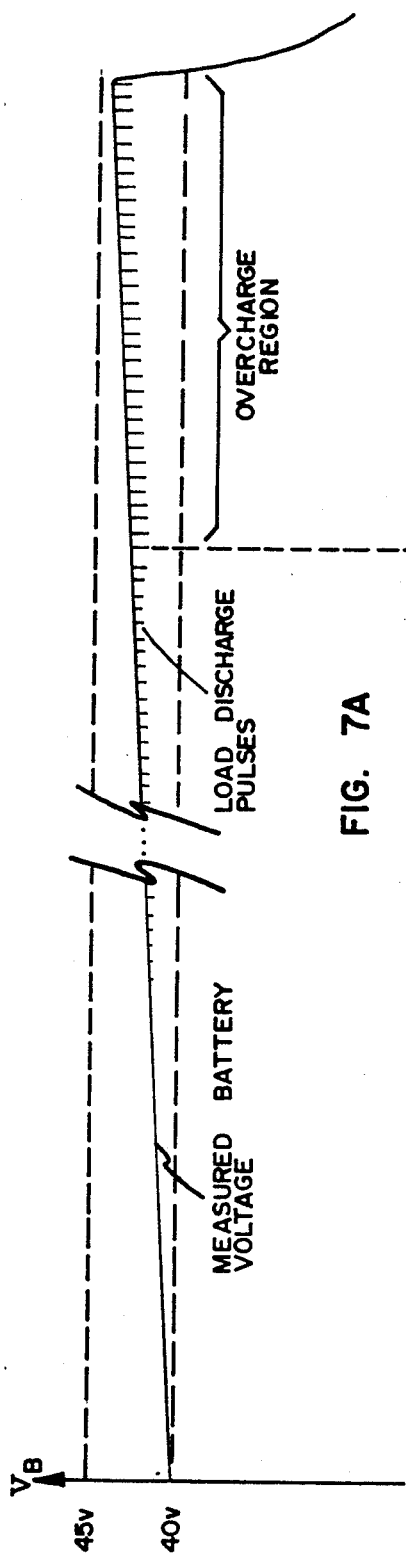
FIG. 7A is a diagrammatic graphical representation of battery voltage and load discharge pulse measurements as they would typically appear when measured by the battery charging control apparatus of FIGS. 4–6 during charging of a typical B6 volt lead-acid type battery.
Figure 7B:
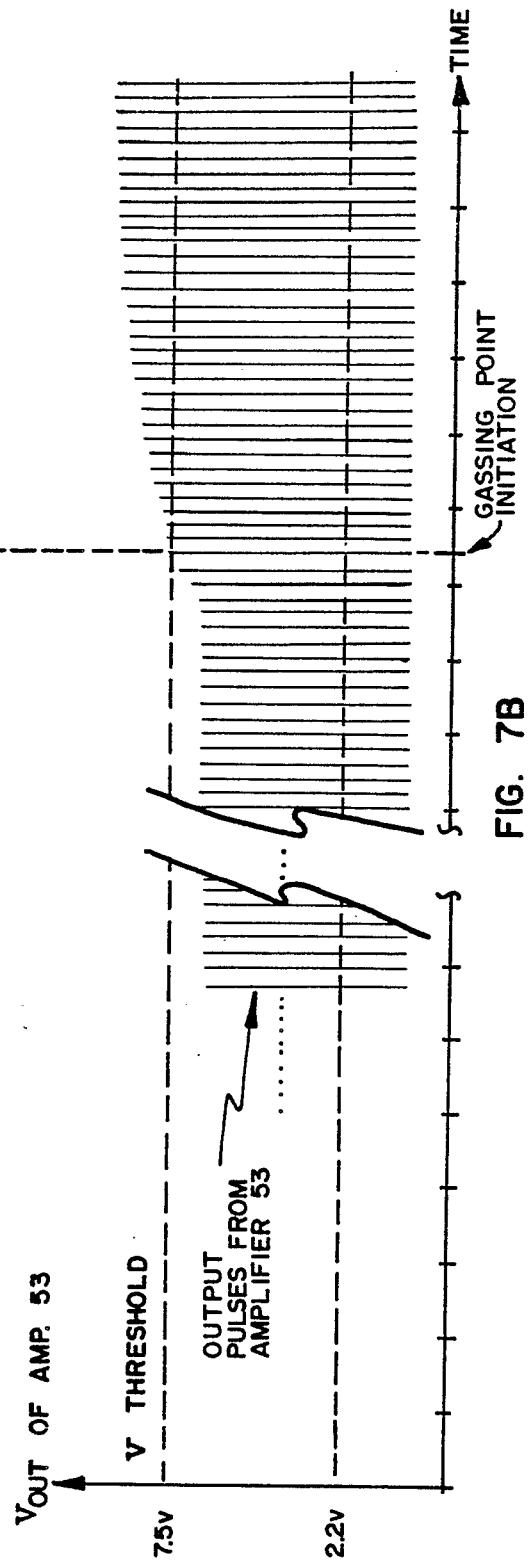
FIG. 7B is an enlarged illustration of a portion of the load discharge pulse representations of FIG. 7A.

When the gassing point of the battery is reached, the measured voltage across the load resistor 71 changes dramatically, (as much as by a factor of 3–10) over a very short time interval, as illustrated in more detail with reference to FIG. 7A. Referring to FIG. 7A, the load discharge voltage pulses are illustrated as they would typically appear superimposed on the charging voltage of the Battery Network 10. It will be noted that the load discharge pulses are barely detectable until the gassing point of the Battery Network 10 is reached. FIG. 7B illustrates the measured pulses as they would appear in the preferred embodiment at the output of Amplifier 53. The voltage level of the output pulses from Amplifier 53 are relatively constant until the battery enters into its gassing region, at which time the output pulse level dramatically rises. Resistor 59 and capacitor 64 further filter out extraneous noise and ripple signals that manage to pass through the first Amplifier 53 stage. The amplified output signals from Amplifier 53 are applied to the noninverting input terminal of Comparator Amplifier 61 and are compared against a predetermined threshold voltage level as determined by the voltage divider network 40. In the preferred embodiment the threshold voltage level applied to the inverting input terminal of Amplifier 61 has been selected at 7.5 volts, which has been calculated as the voltage level for the preferred embodiment control circuitry that represents entry of the Battery Network 10 into its gassing mode of operation (see FIG. 7B). When the voltage amplitude of the measured discharge pulse signals received by the noninverting input terminal of Amplifier 61 meets or exceeds the 7.5 volt threshold Value established by the voltage divider network, Amplifier 61 provides a positive output pulse to signal flow path (C4) which is applied to the input terminal of Counter 85 and to the "data" input terminal of flip-flop 92 (see FIG. 5). When flip-flop 92 is clocked by means of the next output pulse from Timer 75, flip-flop 92 switches states, causing the signal output from its $\overline{Q}$ output terminal to inhibit further clock pulses to the input of Counter 96. Subsequent output pulses from Amplifier 61 are counted by Counter 85 which, in the preferred embodiment, accumulates a count of 32 before applying a completed count output signal to its output terminal.

It will readily be understood by those skilled in the art that the predetermined count accumulated by Counter 85 can be adjusted to provide any desired representative time interval. In the preferred embodiment, the 32 count, coupled with the five minute pulse intervals provided by Timer 75, provides an elapsed time between receipt of the first input pulse and the thirty-second input pulse, of 160 minutes. Therefore, in the preferred embodiment, the battery charging network 15 continues to operate in a charging mode, and to charge the Battery Network 10, for approximately 2 hours and 40 minutes after initiation of the gas discharge phase of the battery. This time interval has been calculated, for the 36 volt nominal voltage batteries being charged to provide the optimal time period for providing approximately a 10% overcharge to the Battery Network 10 after initiation of the gas discharge phase of the battery—while maintaining a safe level of overcharge so as not to damage the battery. The amount of desired overcharge delivered to the battery can be selected to accommodate the size and particular parameters of the battery being charged. However, the preferred range of overcharge typically varies between 5-15%.

When an output signal is provided at the output of Counter 85 following an accumulated count of 32 thereby, LED 90 is energized by means of transistor 88 to indicate that the battery charging cycle has been completed. Simultaneously, a positive input signal is provided by means of the signal flow path (C5) to NOR gate 125 to disable transistor 127 and the relay coil 16a, thereby discontinuing further charging of the Battery Network 10. The logical low signal output from NOR gate 125 is also carried by means of the signal flow path (C3) to the input terminals of NAND gates 45 and 46 causing them to respectively provide logical high input signals by means of the signal flow paths (Cl) and (C2) respectively to the NOR gates 100 and 105 to disable LED's 104 and 109, to disable Timer 75 and to provide a logical low input level to the "data" input terminal of flip-flop 94—thereby disabling the pulse load monitoring operation of the control network. However, the First Battery Voltage Monitoring Network 30 continues to monitor the battery terminal voltage level for maintaining the battery charge level over extended periods of nonuse and connection to the Battery Charging Network. In the event that the battery voltage falls below the threshold voltage established as a reference at the noninverting input terminal of Amplifier 34, the signal output from Amplifier 34 switches to a logical "low" input level causing the signal output of Amplifier 38 to switch to a logical "high", resetting Counters 96 and 85 and flip-flop 92 and reinitiating the battery charging operation as hereinbefore described. In the preferred embodiment the recharging operation is initiated when the battery voltage drops below 38 volts.

It will be appreciated by those skilled in the art that other circuit configurations that embody the principles of this invention can be configured within the spirit and intent of this invention. The above circuit configuration was provided only as an example of one possible embodiment that incorporates and practices the principles of the present invention. Other modifications and alterations of not only the circuit configuration but also the components therein are well within the knowledge of those skilled in the art and are to be included within the broad scope of the appended claims.

What is claimed is:

1. Apparatus for charging a battery of the type that enters into a gassing phase when full charge is approached, comprising:
    (a) means for applying charging current to charging terminals of the battery;
    (b) means operatively connected with said battery charging terminals for periodically operatively connecting a load across said battery terminals;
    (c) means operatively connected to said load for sensing the electrical response of said load when energized by said battery and for providing a sensed load signal in response thereto;
    (d) means operatively connected to receive said sensed load signal for isolating therefrom that portion of said sensed load signal attributable only to energization of said load by said battery;
    (e) means operatively connected to receive said isolated sensed load signal for determining therefrom when said battery enters its gassing phase and for producing a gassing phase signal indicative of the gassing phase condition of said battery; and
    (f) means operatively connected with said battery and to receive said gassing phase signal for applying a predetermined overcharge to said battery after said battery has entered into its gassing phase.

2. Battery charging apparatus as recited in claim 1, wherein said means for periodically applying a load to said battery terminals operates on a load applying duty cycle of less than about 1%.

3. Battery charging apparatus as recited in claim 1, wherein said sensing means measures the absolute value of said electrical response of said load.

4. Battery charging apparatus as recited in claim 3, wherein said sensing means includes a linear amplifier operatively connected for amplifying, without saturation, said absolute value signal and for producing said sensed load signal therefrom.

5. Battery charging apparatus as recited in claim 1, wherein said isolating means includes means for filtering out from said sensed load signal, noise signals and charging voltage signals caused by said charging current supply means.

6. Battery charging apparatus as recited in claim 1, wherein said overcharge means includes means for returning an overcharge to said battery in the range of from about 5 to 15%.

7. Battery charging apparatus as recited in claim 6, wherein said overcharge means includes means for returning an overcharge to said battery in the range of from about 7 to 12%.

8. Battery charging apparatus as recited in claim 1, further including means for terminating further charging of said battery when said predetermined overcharge has been supplied to the battery.

9. Battery charging apparatus as recited in claim 1, wherein said means for applying a predetermined overcharge to said battery includes first timing means for charging said battery during only a predetermined time interval after said battery has entered into its gassing phase.

10. Battery charging apparatus as recited in claim 1, further including means operatively connected with said battery terminals for sensing the voltage at said battery terminals during charging thereof and for disabling said load connecting means until the voltage at said battery terminals has attained a first predetermined battery voltage known to precede that terminal voltage at which said battery normally enters into its gassing phase.

11. Battery charging apparatus as recited in claim 10, wherein said terminal voltage sensing means is operatively connected to receive said gassing phase signal and further includes second timing means for enabling operation of said load connecting means during only a fixed predetermined time interval after said battery terminal voltage has attained said first predetermined battery voltage and when the state of said gassing phase signal indicates that the battery has entered into its gassing phase.

12. Circuit apparatus for electrically determining entry of a battery being charged, into its gassing region, comprising:
   (a) means suitable for connection to the terminals of a battery for periodically operatively applying a load across the battery terminals during charging thereof, whereby a current flow path is established from said battery terminals and through said load;
   (b) sensor means operatively connected to said battery for producing a sensed signal responsive to current flow through said battery;
   (c) means operatively connected to receive said sensed signal for isolating therefrom that portion of said sensed signal attributable only to the current flow through said battery that is caused by said load and for producing an isolated sensed signal in response thereto;
   (d) means for establishing a threshold reference voltage; and
   (e) means operatively connected to receive said isolated sensed signal and said threshold reference voltage for comparing said isolated sensed signal with said threshold reference voltage, and for producing a comparison signal in response thereto, wherein said comparison signal is indicative of whether said battery has entered into its gassing phase.

13. Circuit apparatus as recited in claim 12, wherein said means for periodically applying a load across said battery terminals operates on a load applying duty cycle of less than 1%.

14. Circuit apparatus as recited in claim 12, wherein said load is a resistive load, and wherein said sensor means is operative to sense the voltage change across said battery.

15. Circuit apparatus as recited in claim 14, wherein said sensor means measures the absolute value of said voltage change across said battery.

16. Circuit apparatus as recited in claim 15, wherein said sensor means includes a linear amplifier operatively connected for amplifying in its linear range, said absolute value signal and for producing said sensed signal therefrom.

17. Circuit apparatus as recited in claim 12, wherein said isolating means includes means for filtering out from said sensed signal, noise signals and signals introduced to said sensed signal resulting from charging of the battery.

18. Circuit apparatus as recited in claim 12, wherein said threshold reference voltage is set at a value such that the magnitude of said sensed signal must change by a factor of about 2 to 5 times within relatively few loading cycles of said battery, before said comparison signal indicates entry of said battery into its gassing phase.

19. A method of charging a battery of the type that enters into a gassing phase as full charge of the battery is approached, comprising the steps of:
   (a) applying a charging current to the terminals of the battery;
   (b) periodically operatively applying an electrical load to the battery;
   (c) obtaining a responsive signal from the load when it is operatively connected to the battery;
   (d) isolating from said load responsive signal that portion thereof attributable only to energization of said load by said battery;
   (e) determining entry of the battery into its gassing phase from said isolated load responsive signal; and
   (f) applying a predetermined overcharge to said battery after said battery enters its said gassing phase.

20. A method as recited in claim 19, wherein the step of periodically applying an electrical load to the battery is performed on a load applying duty cycle of less than about 1%.

21. The method as recited in claim 19, wherein the step of obtaining a responsive signal from the load includes measuring the absolute value of the electrical response of said load to energization by said battery.

22. A method as recited in claim 19, wherein the step of applying a predetermined overcharge to said battery includes application of a predetermined overcharge to said battery in the range of from about 5 to 15%.

23. A method as recited in claim 19, wherein the step of applying a predetermined overcharge to said battery includes application of a predetermined overcharge to said battery in the range of from about 7 to 12%.

24. A method as recited in claim 19, including the steps of predicting a charging voltage that will occur at the battery terminals at a time in the charging operation of said battery just prior to entry of said battery into its gassing phase, and disabling said periodic application of said load to the battery during charging of the battery until said predicted charging voltage occurs at the battery terminals.

25. The method as recited in claim 19, wherein the step of determining entry of the battery into its gassing phase includes comparing said load responsive signal with a predetermined threshold signal and providing a gassing phase confirmation signal when said load responsive signal corresponds to said threshold signal.

26. The method as recited in claim 25, including the step of disabling application of charging current to the terminals of the battery and application of said electrical load to the battery if said load responsive signal does not correspond to said threshold signal within a predetermined time interval following initiation of the comparison process.

27. The method as recited in claim 19, wherein the step of applying a predetermined overcharge to said battery comprises maintaining said charging current application to the terminals of said battery for a predetermined time interval after said determination has been made that said battery has entered into its said gassing phase.

28. A method of determining entry of a battery being charged, into its gassing phase, comprising the steps of:
   (a) applying a resistive load across the battery terminals at periodic predetermined intervals of time during the charging cycle, the length of said intervals being less than about 10% of the anticipated time required to maximize overcharge of the battery during its gassing phase;

(b) monitoring the voltage level caused at the resistive load;

(c) isolating the battery component of the monitored voltage level signal from other signal components which comprise said monitored voltage level;

(d) comparing said isolated load signal with a predetermined threshold value signal; and (e) determining entry of said battery into its gassing phase based on said comparison.

29. The method as recited in claim 28, wherein the length of said intervals at which said resistive load is applied across the battery terminals is less than about 5% of the anticipated time required to maximize overcharge of the battery during its gassing phase.

30. The method as recited in claim 28, wherein said resistive load is applied across the battery terminals on a duty cycle of less than about 1%.

31. The method as recited in claim 28, wherein the step of monitoring the voltage level at the resistive load includes measuring the absolute value of the voltage drop across said load.

* * * * *